United States Patent [19]

Hegendorfer

[11] 3,836,908

[45] Sept. 17, 1974

[54] DIGITAL TO ANALOG CONVERTER

[75] Inventor: Max Hegendorfer, Forchheim, Germany

[73] Assignee: Grundig E.M.V. Elektro-Mechanische Versuchsanstalt, Furth/Bayern, Germany

[22] Filed: Dec. 19, 1973

[21] Appl. No.: 426,362

[30] Foreign Application Priority Data

Apr. 10, 1973 Germany ............................ 2317851

[52] U.S. Cl.. 340/347 DA, 340/347 NT, 340/146.2, 235/93 CA

[51] Int. Cl. ............................................ H03k 13/06

[58] Field of Search ... 340/347 NT, 347 DA, 146.2; 235/92 CU, 92 CA, 92 NT

[56] References Cited

UNITED STATES PATENTS

| | | | |
|---|---|---|---|
| 2,907,021 | 9/1959 | Woods | 340/347 |
| 3,371,334 | 2/1968 | Asher et al. | 340/347 DA |
| 3,490,017 | 1/1970 | Kolell et al. | 340/347 |
| 3,576,575 | 4/1971 | Hellwarth | 340/347 DA |
| 3,731,300 | 8/1971 | Greutman et al. | 340/347 DA |

*Primary Examiner*—Charles E. Atkinson
*Assistant Examiner*—Vincent J. Sunderdick
*Attorney, Agent, or Firm*—Michael S. Striker

[57] ABSTRACT

An arrangement for converting digital signal to analog signals comprising a comparator, a comparison digit generator and an input digit generator. The ordered inputs and outputs of the comparator and the comparison digit generator, respectively, are connected in a predetermined permuted manner.

9 Claims, 15 Drawing Figures

OUTPUT OF COMPARISON DIGIT GENERATOR (BINARY NUMBER $A_1$)

t ↓ INCREASING TIME

| $2^0$ | $2^1$ | $2^2$ | $2^3$ | DECIMAL NUMBER EQUIVALENT |
|---|---|---|---|---|
| 0 | 0 | 0 | 0 | 0 |
| 1 | 0 | 0 | 0 | 1 |
| 0 | 1 | 0 | 0 | 2 |
| 1 | 1 | 0 | 0 | 3 |
| 0 | 0 | 1 | 0 | 4 |
| 1 | 0 | 1 | 0 | 5 |
| 0 | 1 | 1 | 0 | 6 |
| 1 | 1 | 1 | 0 | 7 |
| 0 | 0 | 0 | 1 | 8 |
| 1 | 0 | 0 | 1 | 9 |
| 0 | 1 | 0 | 1 | 10 |
| 1 | 1 | 0 | 1 | 11 |
| 0 | 0 | 1 | 1 | 12 |
| 1 | 0 | 1 | 1 | 13 |
| 0 | 1 | 1 | 1 | 14 |
| 1 | 1 | 1 | 1 | 15 |

INPUT OF COMPARATOR (BINARY NUMBER $A_2$)

t ↓ INCREASING TIME

| $2^0$ | $2^1$ | $2^2$ | $2^3$ | DECIMAL NUMBER EQUIVALENT |
|---|---|---|---|---|
| 0 | 0 | 0 | 0 | 0 |
| 1 | 0 | 0 | 0 | 1 |
| 0 | 1 | 0 | 0 | 2 |
| 1 | 1 | 0 | 0 | 3 |
| 0 | 0 | 1 | 0 | 4 |
| 1 | 0 | 1 | 0 | 5 |
| 0 | 1 | 1 | 0 | 6 |
| 1 | 1 | 1 | 0 | 7 |
| 0 | 0 | 0 | 1 | 8 |
| 1 | 0 | 0 | 1 | 9 |
| 0 | 1 | 0 | 1 | 10 |
| 1 | 1 | 0 | 1 | 11 |
| 0 | 0 | 1 | 1 | 12 |
| 1 | 0 | 1 | 1 | 13 |
| 0 | 1 | 1 | 1 | 14 |
| 1 | 1 | 1 | 1 | 15 |

OUTPUT OF COMPARISON DIGIT GENERATOR (BINARY NUMBER A1)

↓ t (INCREASING TIME)

| $2^0$ | $2^1$ | $2^2$ | $2^3$ | DECIMAL NUMBER EQUIVALENT |
|---|---|---|---|---|
| 0 | 0 | 0 | 0 | 0 |
| 1 | 0 | 0 | 0 | 1 |
| 0 | 1 | 0 | 0 | 2 |
| 1 | 1 | 0 | 0 | 3 |
| 0 | 0 | 1 | 0 | 4 |
| 1 | 0 | 1 | 0 | 5 |
| 0 | 1 | 1 | 0 | 6 |
| 1 | 1 | 1 | 0 | 7 |
| 0 | 0 | 0 | 1 | 8 |
| 1 | 0 | 0 | 1 | 9 |
| 0 | 1 | 0 | 1 | 10 |
| 1 | 1 | 0 | 1 | 11 |
| 0 | 0 | 1 | 1 | 12 |
| 1 | 0 | 1 | 1 | 13 |
| 0 | 1 | 1 | 1 | 14 |
| 1 | 1 | 1 | 1 | 15 |

INPUT OF COMPARATOR (BINARY NUMBER A2)

↓ t (INCREASING TIME)

| $2^0$ | $2^1$ | $2^2$ | $2^3$ | DECIMAL NUMBER EQUIVALENT |
|---|---|---|---|---|
| 0 | 0 | 0 | 0 | 0 |
| 0 | 0 | 0 | 1 | 8 |
| 0 | 0 | 1 | 0 | 4 |
| 0 | 0 | 1 | 1 | 12 |
| 0 | 1 | 0 | 0 | 2 |
| 0 | 1 | 0 | 1 | 10 |
| 0 | 1 | 1 | 0 | 6 |
| 0 | 1 | 1 | 1 | 14 |
| 1 | 0 | 0 | 0 | 1 |
| 1 | 0 | 0 | 1 | 9 |
| 1 | 0 | 1 | 0 | 5 |
| 1 | 0 | 1 | 1 | 13 |
| 1 | 1 | 0 | 0 | 3 |
| 1 | 1 | 0 | 1 | 11 |
| 1 | 1 | 1 | 0 | 7 |
| 1 | 1 | 1 | 1 | 15 |

OUTPUT OF COMPARISON DIGIT GENERATOR (BINARY NUMBER $A_1$) — INPUT OF COMPARATOR (BINARY NUMBER $A_2$)

t (INCREASING TIME) ↓

| $2^0$ | $2^1$ | $2^2$ | $2^3$ | DECIMAL NUMBER EQUIVALENT | $2^0$ | $2^1$ | $2^2$ | $2^3$ | DECIMAL NUMBER EQUIVALENT |
|---|---|---|---|---|---|---|---|---|---|
| 0 | 0 | 0 | 0 | 0 | 0 | 0 | 0 | 0 | 0 |
| 1 | 0 | 0 | 0 | 1 | 1 | 0 | 0 | 0 | 1 |
| 0 | 1 | 0 | 0 | 2 | 0 | 1 | 0 | 0 | 2 |
| 1 | 1 | 0 | 0 | 3 | 1 | 1 | 0 | 0 | 3 |
| 0 | 0 | 1 | 0 | 4 | 0 | 0 | 0 | 1 | 8 |
| 1 | 0 | 1 | 0 | 5 | 1 | 0 | 0 | 1 | 9 |
| 0 | 1 | 1 | 0 | 6 | 0 | 1 | 0 | 1 | 10 |
| 1 | 1 | 1 | 0 | 7 | 1 | 1 | 0 | 1 | 11 |
| 0 | 0 | 0 | 1 | 8 | 0 | 0 | 1 | 0 | 4 |
| 1 | 0 | 0 | 1 | 9 | 1 | 0 | 1 | 0 | 5 |
| 0 | 1 | 0 | 1 | 10 | 0 | 1 | 1 | 0 | 6 |
| 1 | 1 | 0 | 1 | 11 | 1 | 1 | 1 | 0 | 7 |
| 0 | 0 | 1 | 1 | 12 | 0 | 0 | 1 | 1 | 12 |
| 1 | 0 | 1 | 1 | 13 | 1 | 0 | 1 | 1 | 13 |
| 0 | 1 | 1 | 1 | 14 | 0 | 1 | 1 | 1 | 14 |
| 1 | 1 | 1 | 1 | 15 | 1 | 1 | 1 | 1 | 15 |

DIGITAL TO ANALOG CONVERTER

BACKGROUND OF THE INVENTION

The present invention relates to digital to analog converters, and more particularly to digital to analog converters using a comparator element.

Some of the most important considerations in the design of such converters are accuracy and speed. In the operation of presently known digital to analog converters, a reference number will be continuously incremented by clock pulses. The comparator will then compare each of these numbers with the input number to be measured, and will produce a signal indicating whether the reference number is greater than or less than the input number. This output signal will then be integrated over an appropriate period of time to produce an analog signal corresponding to the digital input signal.

The operation of the above described converter produces a relatively long period, low frequency output signal. The accuracy of the analog signal depends on the accuracy of the integration of this signal, which is a technically more difficult problem than integrating a high frequency signal.

SUMMARY OF THE INVENTION

The object of the invention is to provide a novel and improved apparatus for converting digital to analog signals using a comparator.

Another object of the invention is to provide the apparatus with novel means for increasing the frequency of the pulse modulated output signal of the comparator.

Another object of the invention is to provide a novel means for increasing the accuracy of the analog signal output of a digital to analog converter without increasing the technological complexity or cost of the device.

The invention is embodied in an apparatus comprising a clock (or oscillator), a comparison digit generator which generates successive numbers in response to clock signals, an input digit generator which generates signals corresponding to the inputed digital number, and a comparator which compares the numbers produced by the comparison digit generator and the input number generator.

The output of the comparator is a pulse modulated signal which can then be transmitted to an integrator which will in effect "average" the signal over a period of time corresponding to the full range of the comparison digit generator. The output of the integrator will be an analog signal corresponding to measuring the digital number of the input digit generator.

The particular novel means associated with the invention are incorporated in the connection between the comparison digit generator and the comparator. Normally, the connection specifies that the output of the comparison digit generator is the same as the input of the comparator. In an embodiment of the invention, the connections between the comparison digit generator and the comparator are premuted in a predetermined manner. As a result, although the numbers generated by the comparison digit generator are successive, the numbers which appear as input to the comparator are not successive but fluctuate in a systematic manner over the entire range of output values of the comparison digit generator. As a result, there is more variation in the comparison operation, and the pulse modulation of the output signal will result in a higher frequency.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figures 1A, 1B:
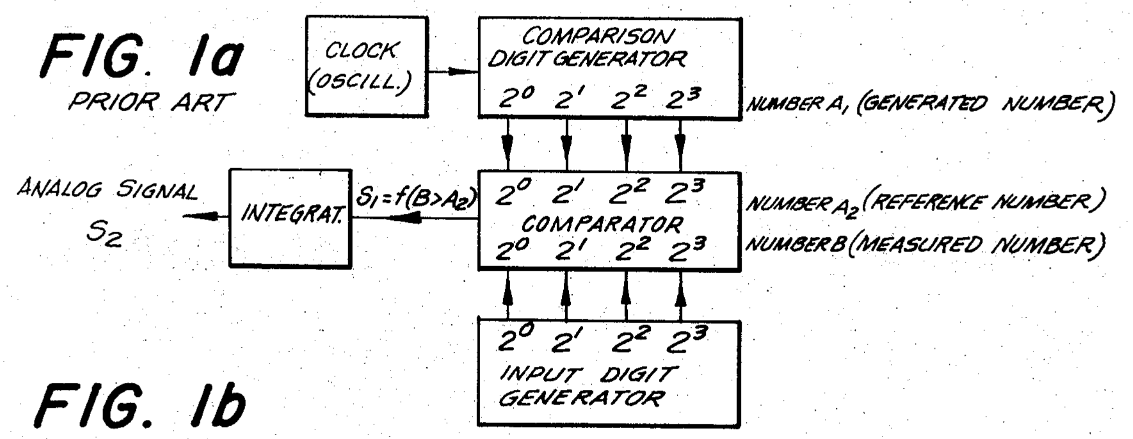
FIG. 1a PRIOR ART
FIG. 1b PRIOR ART
FIG. 1*a* is a block diagram of a presently known digital analog converter.
FIG. 1*b* represent tables of the output of the Comparaison Digit Generator, and the input of the Comparator, over a period of time, for the device shown in 1*a*.

FIG. 1*a* is a block diagram of a ordinary digital-analog converter.

FIG. 1*b* is a table representing the operation of the above converter, indicating the output of the Comparison Digit Generator, and the first input to the Comparator. The output and first input are represented in binary digit form, in the order shown in the tables. A decimal notation number equivalent is also shown for reference. The passage of time increments is represented by going down the table, in the direction *t*, row by row.

Figures 1C, 1D, 1E:
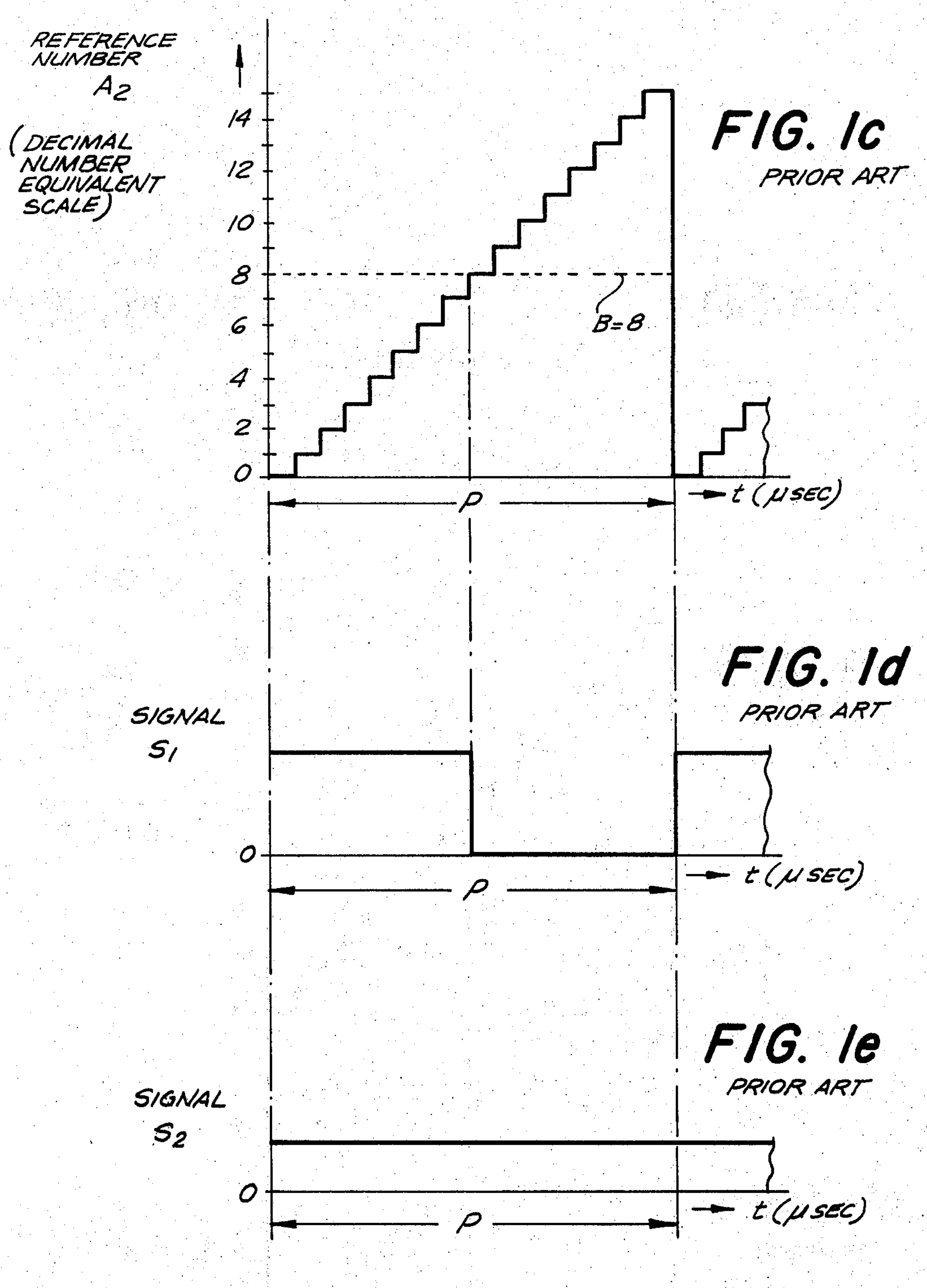
FIG. 1*c* is a graph of the input number to the Comparator over time.
FIG. 1*d* indicates the output of the Comparator over the same period.
FIG. 1*e* indicates the output of the integrator over the same period.

FIG. 1*c* is a time diagram indicating the decimal notation equivalent (on the ordinate scale) of the Reference Number $A_2$ representing both the output of the Comparison Digit Generator, and the first input to the Comparator, over one period P of time, for the above converter.

FIG. 1*d* is a time diagram on the same scale as (1*c*) above indicating the output signal of the Comparator in the case that the Measured Number B has a decimal notation equivalent value of 8.

FIG. 1*e* is a time diagram on the same scale as (1*c*) and (1*d*) above indicating the output signal of the Integrator.

In the operation of the usual digital-analog converter (FIG. 1*a*) a Comparison Digit Generator produces a sequence of binary encoded numbers in response to clock signals generated by an oscillator. This sequence of consecutive binary numbers $A_1$ is then fed directly, digit for digit, into the first input of the Comparator, so that the Comparator Digit Generator's $A_1$ is identical with the Reference Number $A_2$. (as seen in FIG. 1b). FIG. 1c represents the output of the Comparison Digit Generator over a period of time P, in decimal notation equivalent form. The "staircase" waveform reaches a maximum amplitude corresponding to the largest number able to be handled by the Comparator, determined by the number of binary digit inputs to it. In the example we are using, the largest number is 1111, or 15 in decimal notation, and thus the maximum amplitude of the pulse is 15. The "staircase" waveform then returns to zero amplitude, and continues in a periodic manner in the direction of increasing time, as indicated by the arrow *t*.

In the Comparator, the Reference Number $A_2$ is to be compared with the digital input signal which one desires to convert to an analog signal. This digital input signal is separated into its discrete binary digits by the Digit Input Generator, which are inputed to the Comparator as the "measured number" B. The Comparator compares the two numbers $A_2$ and B digit for digit and determines if the condition $B > A_2$ is fulfilled. If such a condition is fulfilled, the output signal $S_1$ of the Comparator has a magnitude of one, if the condition is not fulfilled, the output signal $S_1$ has magnitude zero. The Comparator operates continuously in time, and in FIG. 1d, the output signal $S_1$ is shown for a particular measured number B, 0001, or 8 in decimal notation.

The periodic signal $S_1$ which we note has a relatively low frequency, is then inserted in an Integrator, as shown in FIG. 1a, of standard design and construction, preferably including RC-circuits, and a constant analog signal output $S_2$ (as shown in FIG. 1e) is produced by the Integrator, corresponding in magnitude to the digital value of the measured number B.

Figures 2A, 2B:
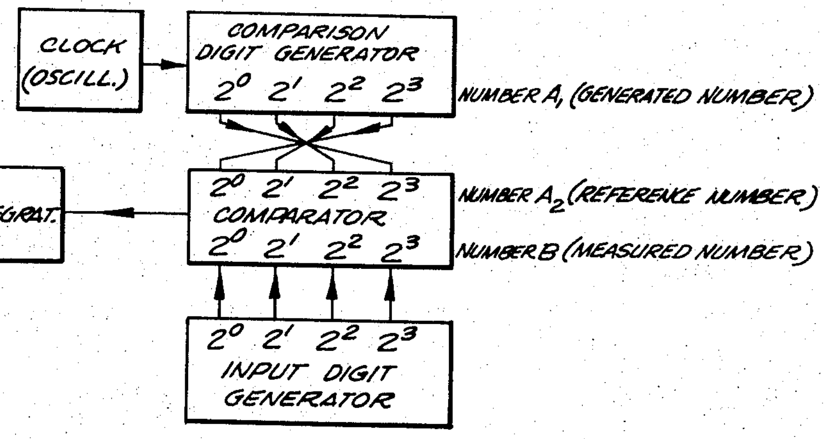
FIG. 2*a* is a block diagram representing the first preferred embodiment of the invention.
FIGS. 2*b*, 2*c*, 2*d* and 2*e* represent corresponding tables or graphs for the device shown in FIG. 2*a*.

The first preferred embodiment of the invention is shown in block diagrams in FIG. 2a. In this embodiment, the output of the first digit of the Comparison Digit Generator (CDG) is connected with the last digit input of the Reference Number input of the Comparator; the second digit of the CDG with the penultimate digit input of the Reference Number input of the Comparator, and so on.

Figures 2C, 2D, 2E:
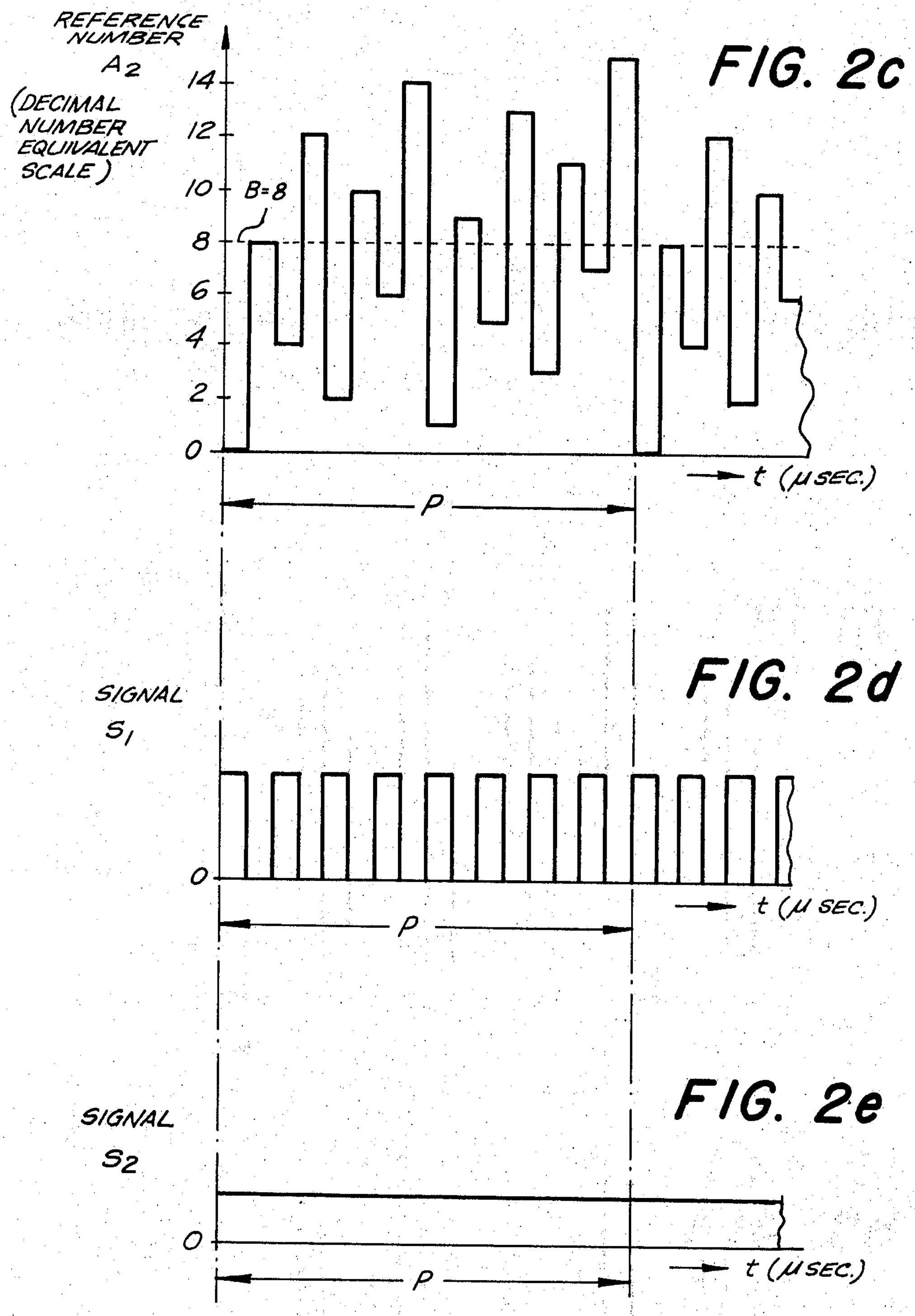

Thus the output number $A_1$ of the CDG will in general be different from the input Reference Number $A_2$ of the Comparator. For the particular example of a four binary digit input, the binary values and decimal notation equivalents for $A_1$ and $A_2$ are given in FIG. 2b. In this case, the values of $A_2$ are represented in a time diagram in FIG. 2c. Again using a measured number of 8, the output of the Comparator in time is represented in FIG. 2d, the signal $S_1$. It is clear from the inspection of FIG. 2d that the frequency of the signal $S_1$ is considerably higher than that obtained by previous methods, as illustrated in FIG. 1d.

An important advantage of the invention is that such a high frequency signal $S_1$ is considerably easier to integrate. Therefore, one is able to perform a digital to analog conversion with relative accuracy without utilizing complicated and expensive technical equipment. Fluctuations in slope size, such as due to temperature dependence of the electrical circuits, will have a deteriorating effect on the accuracy of the converter, which will be proportional to the amount of slopes per period of scanning, i.e. the output frequency of the pulses. Therefore, a compromise is needed between the integration difficulties (ripple) and dependency of temperature. In the apparatus according to FIG. 3 this compromise is worked out by partially applying the "twisting method."

The signals $S_1$ are then transmitted to an integrator, and like before, an analog output signal $S_2$ is produced which corresponds in magnitude to the digital value of the measured number B.

It should be noted that different permutations can be used depending on the particular value of B being measured. The pulse frequency can be adjusted to a particular range of desired.

Figures 3A, 3B:
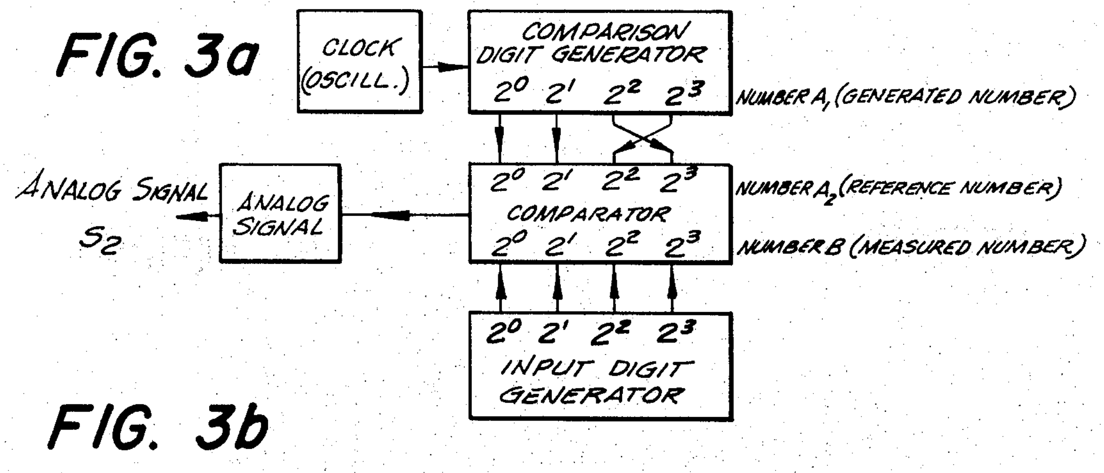
FIG. 3*a* is a block diagram representing another preferred embodiment of the invention.
FIGS. 3*b*, 3*c*, 3*d* and 3*e* represent corresponding tables or graphs for the device shown in FIG. 3*a*.
Figures 3C, 3D, 3E:
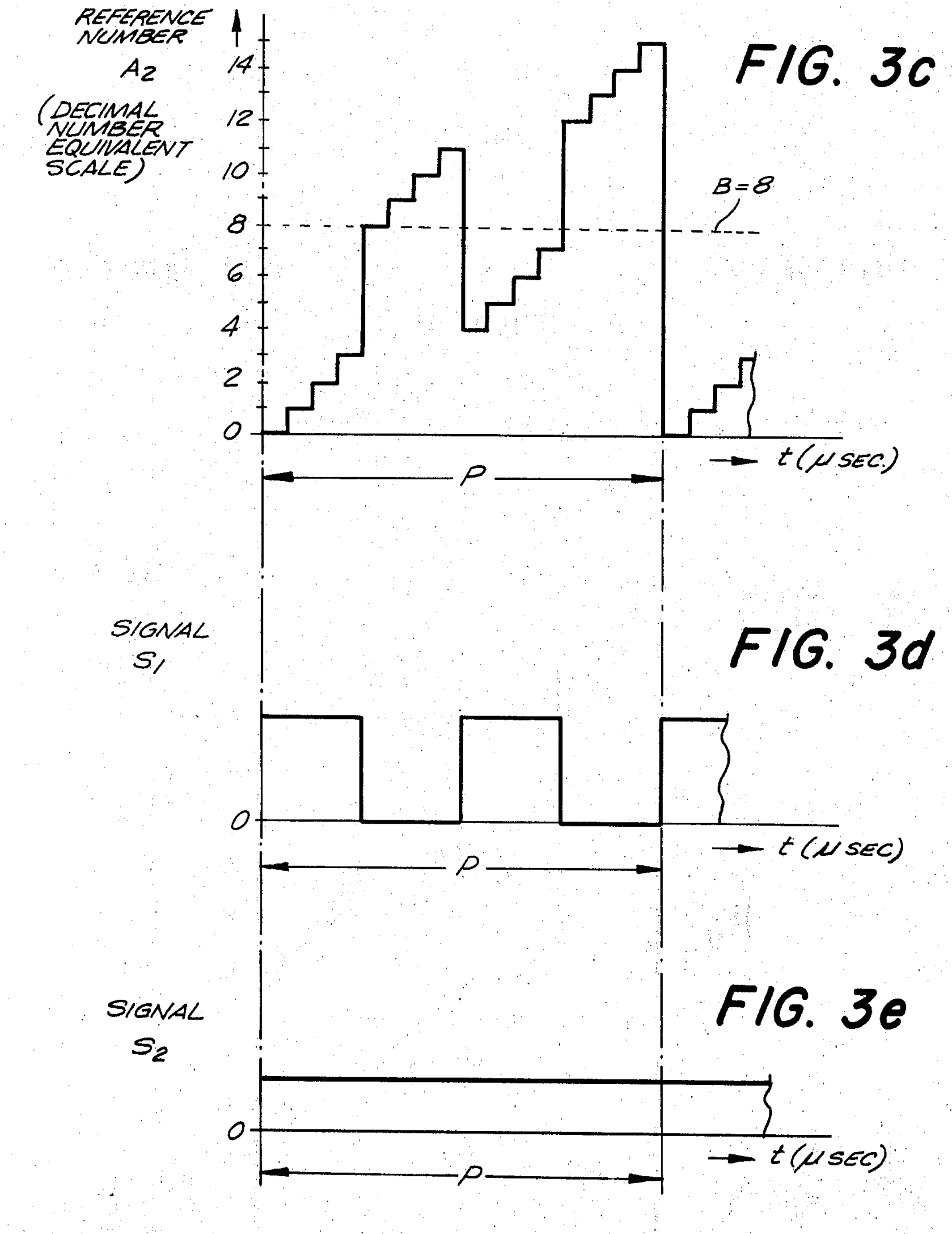

Another embodiment of the invention is shown in block diagram in FIG. 3a. Here the connections of only the two highest digits (and therefore most slowly changing digits are interchanged. FIGS. 3b, 3c, 3d, and 3e illustrate the corresponding tables and graphs for the device shown in FIG. 3a. Examining FIG. 3d, one can see that the pulse frequency of signal $S_1$ is just double that of the original device illustrated in FIGS. 1a and 1d.

By employing the technique disclosed in this invention, it is possible to attain an output frequency of $S_1$ of $2^{n-1}$ cycles in one period, where *n* is the number of digits in the output of the comparison digit generator.

Furthermore, there is a wide variations of the reference number value over each time increment, particularly at the ends of the range of the period. The variation can be as much as a single step function ranging between the values of 0 and $2^n - 2$.

While the invention has been illustrated and described above, it is not intended to be limited to the details shown, since various modifications and structural changes may be made without departing in any way from the spirit of the present invention. For example, the comparator may operate on another functional relationship, such as $A > B$, rather than $B > A$, in the production of an output signal.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. An arrangement for converting digital signals to analog signals comprising, in combination, a comparator, comprising a plurality of ordered first inputs with first signals thereon, a plurality of ordered second inputs with second signals thereon, and an output, wherein the first signals on the said ordered first inputs are compared with the second signals on the said ordered second inputs, to determine a functional relationship between said first and second signals, and reflecting said relationship as an output signal on said output; a comparison digit generator, comprising a plurality of ordered outputs which are respectively connected to predetermined permuted order first inputs of said ordered first inputs of said comparator and an input digit generator, comprising a plurality of ordered outputs connected respectively to the said ordered second inputs of the said comparator.

2. An arrangement as defined in claim 1, further comprising an integrator having an input connected to the said output of said comparator, and having an output producing an analog signal.

3. An arrangement as defined in claim 1, wherein the plurality of ordered outputs of the comparison digit generator correspond to binary digits.

4. An arrangement as defined in claim 1, wherein the plurality of ordered outputs of the input digit generator corresponding to binary digits.

5. An arrangement as defined in claim 1, wherein the said functional relationship between the said first and second signals is that the number represented by the second signals is greater than the number represented by the first signals.

6. An arrangement as defined in claim 1, wherein the consequence of the satisfaction of the said functional relationship is to produce an output signal of unit mangitude on said output of said comparator, and the non-satisfaction of said functional relationship produces an output signal of zero magnitude on said output of said comparator.

7. An arrangement as defined in claim 3, wherein the said predetermined permuted order is a permutation of a predetermined number of the higher valued binary digits.

8. An arrangement as defined in claim 1, wherein the said predetermined permuted order is a permutation connecting the highest ordered output of the comparison digit generator with the lowest ordered first input of the comparator, the second highest ordered output of the comparison digit generator with the second lowest ordered first input of the comparator, and so on, to the lowest ordered output of the comparison digit generator with the highest ordered first input of the comparator.

9. An arrangement as defined in claim 1, wherein the said predetermined permuted order can be changed depending on the number corresponding to the output of the input digit generator.

* * * * *